United States Patent [19]
Gross et al.

[11] Patent Number: 6,044,385
[45] Date of Patent: Mar. 28, 2000

[54] METHOD AND SYSTEM FOR EFFICIENTLY MANAGING THE MANIPULATION OF LARGE DOCUMENTS DISPLAYED WITHIN A COMPUTER SCREEN

[75] Inventors: Dave Henry Gross, Oronoco; Robert Stephen Kemmetmueller, Rochester, both of Minn.

[73] Assignee: International Business Machines Corporation, Armonk, N.Y.

[21] Appl. No.: 08/926,603

[22] Filed: Sep. 10, 1997

[51] Int. Cl.[7] ..................................................... G06F 17/30
[52] U.S. Cl. .......................... 707/526; 707/104; 707/501; 707/512; 707/526; 345/425; 345/427
[58] Field of Search ..................................... 707/501, 513, 707/526, 2, 5, 101, 104, 512; 345/139, 427, 425; 395/139, 342, 355, 773

[56] References Cited

U.S. PATENT DOCUMENTS

| | | | |
|---|---|---|---|
| 5,341,466 | 8/1994 | Perlin et al. | 707/526 |
| 5,670,984 | 9/1997 | Robertson et al. | 345/425 |
| 5,689,287 | 11/1997 | Mackinlay et al. | 345/427 |
| 5,689,669 | 11/1997 | Lynch et al. | 395/355 |
| 5,712,995 | 1/1998 | Cohn | 395/342 |
| 5,734,915 | 3/1998 | Roewer | 707/512 |

*Primary Examiner*—Anton W. Fetting
*Assistant Examiner*—Shahid Alam
*Attorney, Agent, or Firm*—Felsman, Bradley, Gunter & Dillon

[57] ABSTRACT

A method and system for efficiently managing the manipulation of documents too large to be legibly displayed within a computer screen. Initially, a window is provided within which only a portion of an entire document may be displayed legibly. A graphic representation of the entire document is then exhibited within the window. A portion of the graphic representation of the entire document is displayed as a human discernable representation. A remaining portion of the graphic representation of the entire document is displayed as a compressed representation of a portion of the document. The compressed representation is iconic in nature such that a representation nearest the bottom and the top of the document, and furthest away from the human discernable portion, appears as increasingly iconic characters or graphics. The graphic representation itself is composed of a lens bar that allows a user to interpret an entire document displayed within a computer screen at one time on a global scale, while providing the user with an enlarged view of a local area of interest.

18 Claims, 8 Drawing Sheets

METHOD AND SYSTEM FOR EFFICIENTLY MANAGING THE MANIPULATION OF LARGE DOCUMENTS DISPLAYED WITHIN A COMPUTER SCREEN

BACKGROUND OF THE INVENTION

1. Technical Field

The present invention relates in general to improved information processing systems. In particular, the present invention relates to improved information processing systems in which large documents are displayed within a graphic interface. Still more particularly, the present invention relates to a method and system for efficiently managing the manipulation of large documents displayed within a computer screen.

2. Description of the Related Art

The development of computerized distributed information resources, such as the "Internet," allows users to link with servers and networks, and thus retrieve vast amounts of electronic information heretofore unavailable in an electronic medium. Such electronic information increasingly is displacing more conventional means of information transmission, such as newspapers, magazines, and even television. The term "Internet" is an abbreviation for "Internetwork," and refers commonly to a collection of computer networks that utilize the TCP/IP suite of protocols, well-known in the art of computer networking. TCP/IP is an acronym for "Transport Control Protocol/Interface Program," a software protocol developed by the Department of Defense for communication between computers.

Electronic information transferred between computer networks (e.g., the Internet) can be presented to a user in hypertext, a metaphor for presenting information in a manner in which text, images, sounds, and actions become linked together in a complex non-sequential web of associations that permit the user to "browse" through related topics, regardless of the presented order of the topics. These links are often established by both the author of a hypertext document and by the user, depending on the intent of the hypertext document. For example, traveling among hypertext links to the word "iron" in an article displayed within a graphical user interface in a computer system might lead the user to the periodic table of the chemical elements (i.e., linked by the word "iron"), or to a reference to the use of iron in weapons in Europe in the Dark Ages. The term "hypertext" is utilized to describe documents, as presented by a computer, that express the nonlinear structure of ideas, as opposed to the linear format of books, film, and speech.

Hypertext, especially in an interactive format where choices are controlled by the user, is structured around the idea of offering a working and learning environment that parallels human thinking—that is, an environment that allows the user to make associations between topics rather than moving sequentially from one topic to the next, as in an alphabetic list. Hypertext topics are linked in a manner that allows users to jump from one subject to other related subjects during a search for information.

Networked systems utilizing hypertext conventions typically follow a client/server architecture. A "client" is a member of a class or group that utilizes the services of another class or group to which it is not related. In the context of a computer network such as the Internet, a client is a process (i.e., roughly a program or task) that requests a service provided by another program. The client process utilizes the requested service without having to "know" any working details about the other program or the service itself. In networked systems, a client is usually a computer that accesses shared network resources provided by another computer (i.e., a server).

A "server" is typically a remote computer system accessible over a communications medium such as the Internet. The server scans and searches for raw (e.g., unprocessed) information sources (e.g., newswire feeds or newsgroups). Based upon such requests by the user, the server presents filtered electronic information to the user as server responses to the client process. The client process may be active in a first computer system, and the server process may be active in a second computer system, and communicate with one another over a communications medium that allows multiple clients to take advantage of the information-gathering capabilities of the server.

Client and server can communicate with one another utilizing the functionality provided by a hypertext transfer protocol (HTTP). The World Wide web (WWW) or, simply, the "web," includes all servers adhering to this protocol, which are accessible to clients via a Universal Resource Locator (URL). Internet services can be accessed by specifying Universal Resource Locators that have two basic components: a protocol to be used and an object pathname. For example, the Universal Resource Locator address, "http://www.uspto.gov" (i.e., the "home page" for the U.S. Patent and Trademark Office), specifies a hypertext transfer protocol ("http") and a pathname of the server ("www.uspto.gov"). The server name is associated with a unique numeric value (TCP/IP address). Active within the client is a first process, known as a "browser," that establishes the connection with the server and presents information to the user. The server itself executes corresponding server software that presents information to the client in the form of HTTP responses. The HTTP responses correspond to "web pages" constructed from a Hypertext Markup Language (HTML), or other server-generated data.

A "web page" (also referred to by some designers simply as a "page") is a data file written in a hyper-text language that may have text, graphic images, and even multimedia objects such as sound recordings or moving video clips associated with that data file. The web page can be displayed as a viewable object within a computer system. A viewable object can contain one or more components such as spreadsheets, text, hotlinks, pictures, sound, and video objects. A web page can be constructed by loading one or more separate files into an active directory or file structure that is then displayed as a viewable object within a graphical user interface. A web page is thus a form of a document that may be displayed within a graphical user interface. A document, however, need not necessarily be a web page. For example, a document can simply be a word processing document displayed within a graphical user interface environment in which a word processing application operates. The document itself may include many "pages" of scrollable text. Such pages are not equivalent to "web pages," but are analogous to the pages of a book or a sheet or page of bonded paper. Those skilled in the art can appreciate that a distinction thus exists between a web page, a document, and pages included within a document.

When a client workstation sends a request to a server for a web page, the server first transmits (at least partially) the main hypertext file associated with the web page, and then loads, either sequentially or simultaneously, the other files associated with the web page. A given file may be transmitted as several separate pieces via TCP/IP protocol. The constructed web page is then displayed as a viewable object on the workstation monitor. A web page may be "larger"

than the physical size of the monitor screen, and devices such as graphical user interface scroll bars can be utilized by the viewing software (i.e., the browser) to view different portions of the web page.

A problem associated with this type of "scrolling" either in Internet based systems or independent computer systems which utilize graphical user interface devices, is that documents are often too long to fit within a graphical user interface window, well known in the art of data-processing systems. Scroll bars give some sense of the global length of a document displayed within a graphical user interface window, such as a web page, and allow a user to navigate fairly easily through such documents. However, scroll bars lack the ability to allow the user to comprehend how much information is actually located prior to or after a currently displayed portion of the web page or document. Such scroll bars also do not give the user a sense of how this information is "laid out" within the entire document.

From the foregoing it can be seen that a need exists for a method and system that would provide a user with a sense of where the user is located within a long viewable document such as an "online" document or a document contained within a graphical user interface window utilized in accordance with applications such as word processors, spreadsheets, and so forth.

SUMMARY OF THE INVENTION

It is an object of the present invention to provide an improved information processing system.

It is another object of the present invention to provide for improved information processing systems in which large documents are displayed within a graphic interface.

It is yet another object of the present invention to provide an improved method and system for efficiently managing the manipulation of large documents displayed within a computer screen.

The above and other objects are achieved as is now described. A method and system are disclosed for efficiently managing the manipulation of documents too large to be legibly displayed within a computer screen. Initially, a window is provided within which only a portion of an entire document may be displayed legibly. A graphic representation of the entire document is then exhibited within the window. A portion of the graphic representation of the entire document is displayed as a human discernable representation. A remaining portion of the graphic representation of the entire document is displayed as a compressed representation of a portion of the document. The compressed representation is iconic in nature such that a representation nearest the bottom and the top of the document, and furthest away from the human discernable portion, appears as increasingly iconic characters or graphics. The graphic representation itself is composed of a lens bar that allows a user to interpret an entire document displayed within a computer screen at one time on a global scale, while providing the user with an enlarged view of a local area of interest.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of a preferred embodiment when read in conjunction with the accompanying drawings, wherein:

DETAILED DESCRIPTION OF PREFERRED EMBODIMENT

Figure 1:
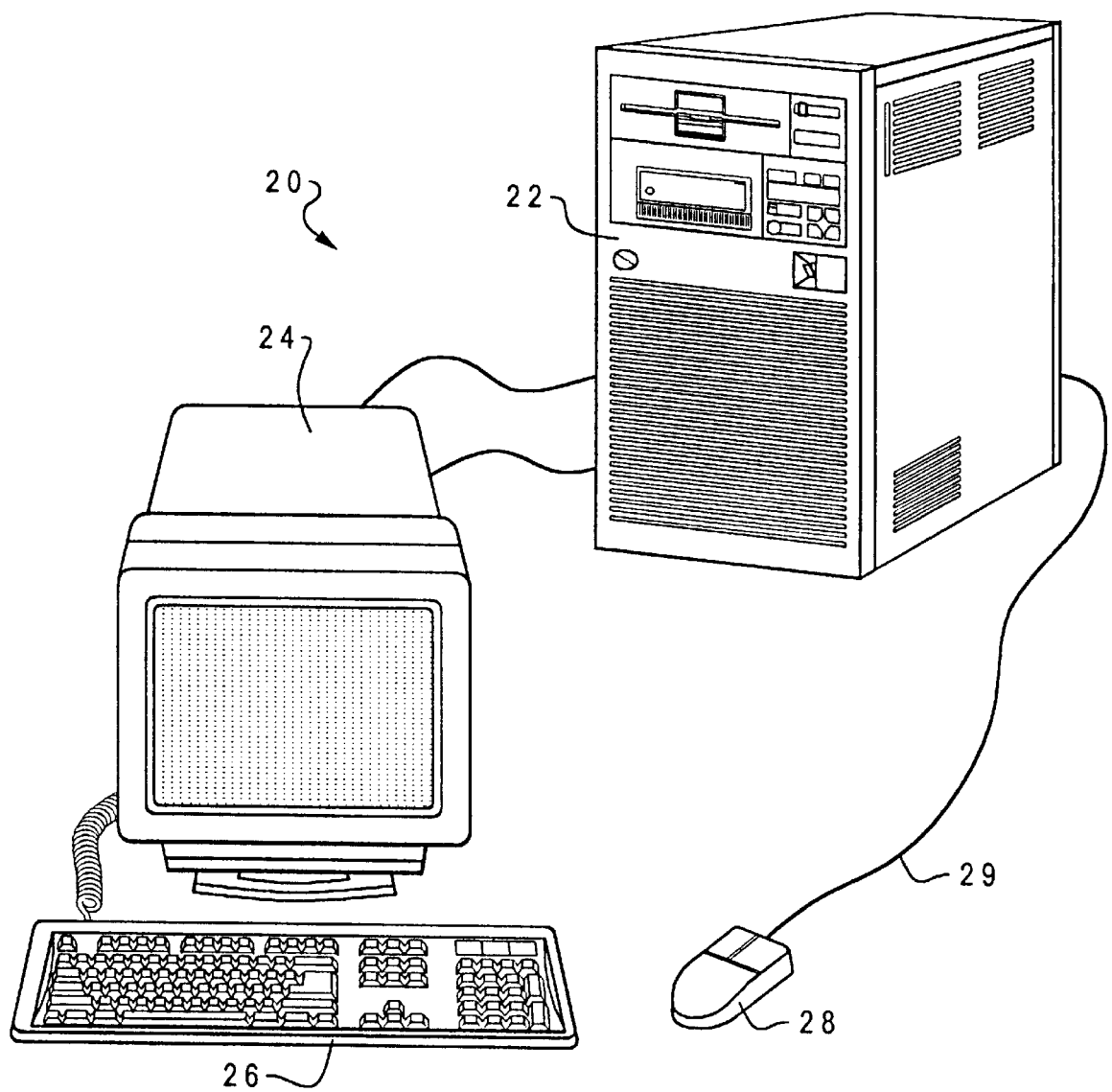
FIG. 1 illustrates a pictorial representation of a computer system which may be utilized to implement a preferred embodiment of the present invention.

With reference now to the figures and in particular with reference to FIG. 1, there is depicted a pictorial representation of a computer system which may be utilized to implement a preferred embodiment of the present invention. A computer system 20 is depicted that includes a system unit 22, a video display terminal 24, a keyboard 26, and a mouse 28. Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display terminal 24. Keyboard 26 includes a standard set of printable characters presented in a QWERTY pattern typical of most typewriters. In addition, keyboard 26 includes a calculator-like numeric keypad at one side. Some of these keys, such as the "control," "alt," and "shift" keys can be utilized to change the meaning of another key. Other special keys and combinations of keys can be utilized to control program operations or to move either text or a cursor on the display screen of video display terminal 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen.

Generally, to select items or choose commands on a screen displayed graphical user interface, the user presses one or more mouse buttons, producing a so-called mouse "click." The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Thus, according to a preferred embodiment of the present invention, the user can utilize the mouse to place the graphical representation of a cursor (i.e. mouse pointer) over a desired hypertext link displayed within a computer screen of a video display terminal such as video display terminal 24, and then, utilizing the pointing device, "click" the mouse at the hypertext link to an Internet web page.

Figure 2:
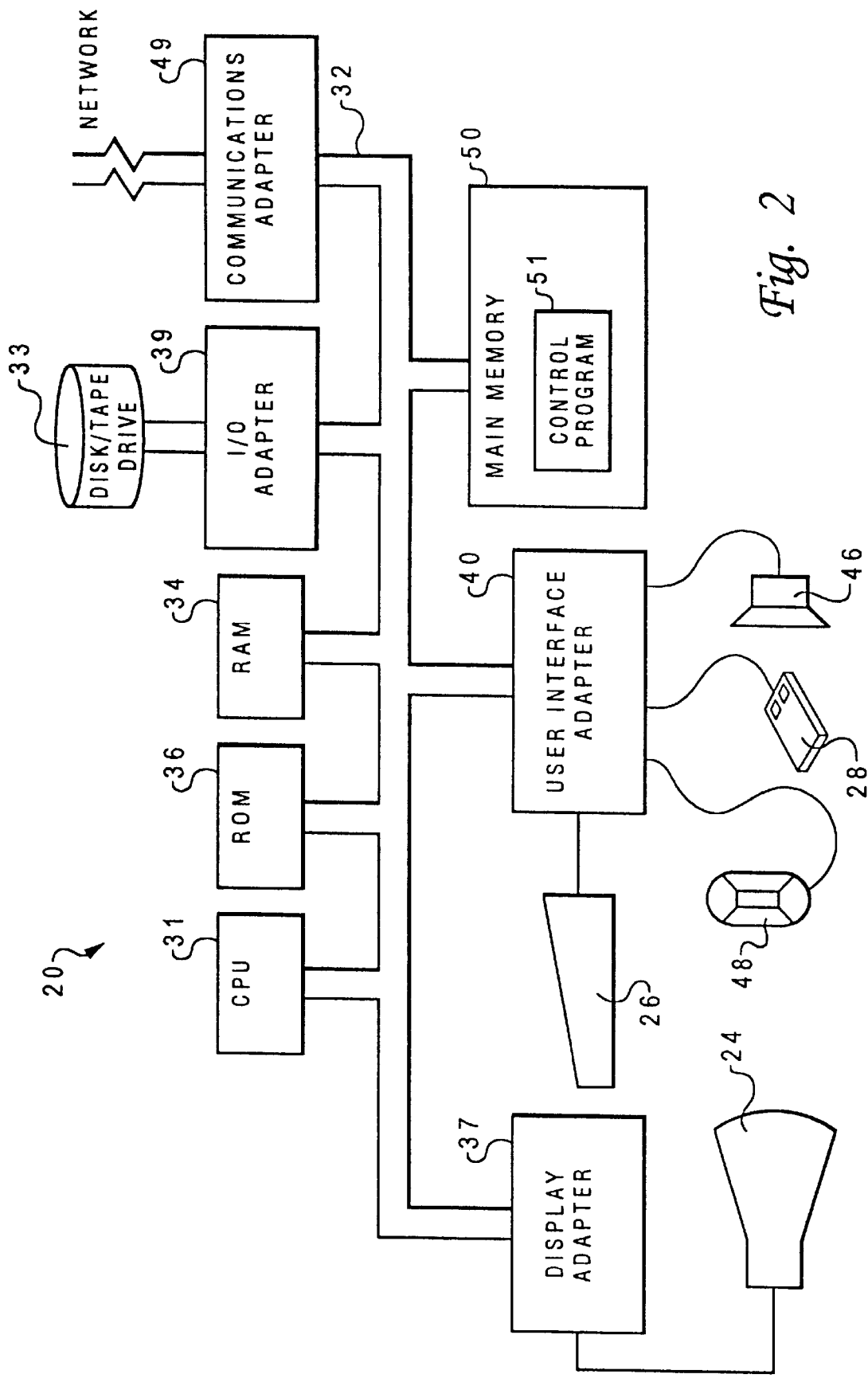
FIG. 2 depicts a representative hardware environment of the computer system illustrated in FIG. 1.

Computer system 20 can be implemented utilizing any suitable computer such as the AS/400 computer system, a product of International Business Machines Corporation (IBM), located in Armonk, N.Y. However, those skilled in the art will appreciate that a preferred embodiment of the present invention can apply to any computer system, regardless of whether the computer system is a complicated multi-user computing apparatus or a single-user workstation or a network computer. In FIG. 1 and FIG. 2, like parts are identified by like numbers. Computer system 20 is thus a configuration that includes all functional components of a computer and its associated hardware. In general, a typical computer system includes a console or system unit such as system unit 22, with one or more disk drives, a monitor such as video display terminal 24, and a keyboard such as keyboard 26. Additional hardware, often referred to in the art as peripheral devices, can include devices such as printers, modems, and joysticks.

FIG. 2 depicts a representative hardware environment of the computer system illustrated in FIG. 1. Computer system 20 includes a Central Processing Unit ("CPU") 31, such as a conventional microprocessor, and a number of other units interconnected via system bus 32. CPU 31 includes a portion of computer system 20 that controls the operation of the entire computer system, including executing the arithmetical and logical functions contained in a particular computer program. Although not depicted in FIG. 2, CPUs such as CPU 31 typically include a control unit that organizes data and program storage in a computer memory and transfers the data and other information between the various parts of the computer system. Such CPUs also generally include an arithmetic unit that executes the arithmetical and logical operations, such as addition, comparison, multiplications and so forth. Such components and units of computer system 20 can be implemented in a system unit such as system unit 22 of FIG. 1.

Computer system 20 further includes random-access memory (RAM) 34, read-only memory (ROM) 36, display adapter 37 for connecting system bus 32 to video display terminal 24, and 110 adapter 39 for connecting peripheral devices (e.g., disk and tape drives 33) to system bus 32. RAM 34 is a type of memory designed such that the location of data stored in it is independent of the content. Also, any location in RAM 34 can be accessed directly without having to work through from the beginning. ROM 36 is a type of memory that retains information permanently and in which the stored information cannot be altered by a program or normal operation of a computer.

Video display terminal 24 provides the visual output of computer system 20. Video display terminal 24 can be a cathode-ray tube (CRT) based video display well-known in the art of computer hardware. However, with a portable or notebook-based computer, video display terminal 24 can be replaced with a liquid crystal display (LCD) based or gas plasma-based flat-panel display. Computer system 20 further includes user interface adapter 40 for connecting keyboard 26, mouse 28, speaker 46, microphone 48, and/or other user interface devices, such as a touch-screen device (not shown), to system bus 32. Communications adapter 49 connects computer system 20 to a computer network. Although computer system 20 is shown to contain only a single CPU and a single system bus, it should be understood that the present invention applies equally to computer systems that have multiple CPUs and to computer systems that have multiple buses that each perform different functions in different ways.

Computer system 20 also includes an interface that resides within a machine-readable media to direct the operation of computer system 20. Any suitable machine-readable media may retain the interface, such as RAM 34, ROM 36, a magnetic diskette, magnetic tape, or optical disk (the last three being located in disk and tape drives 33). Any suitable operating system and associated interface (e.g., Microsoft Windows) may direct CPU 31. For example, the AIX operating system and AIX windows windowing system can direct CPU 31. The AIX operating system is IBM's implementation of the UNIX™ operating system. "UNIX" is a trademark of UNIX Systems Laboratories, Inc. Other technologies also can be utilized in conjunction with CPU 31, such as touch-screen technology or human voice control. Operating systems typically include computer software for controlling the allocation and usage of hardware resources such as memory, CPU time, disk space, and peripheral devices. The operating system is the foundation upon which applications, such as word-processing, spreadsheet, and web browser programs are built.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware and the like, may be utilized in addition to or in place of the hardware already depicted. In addition, main memory 50 is connected to system bus 32, and includes a control program 51. Control program 51 resides within main memory 50, and contains instructions that, when executed on CPU 31, carry out the operations depicted in the logic flowchart of FIG. 7 and FIG. 8 described herein. The instructions also can be referred to as a program product. Control program 51 contains instructions that when executed on CPU 31 can carry out logical operations such as those operations depicted in the logic flow charts of FIG. 7 and FIG. 8 described herein.

It is important to note that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links. Examples of transmission media include devices such as modems. Modems are communication devices that enable computers such as computer 20 depicted in FIG. 1 and FIG. 2 to transmit information over standard telephone lines.

Figure 3:
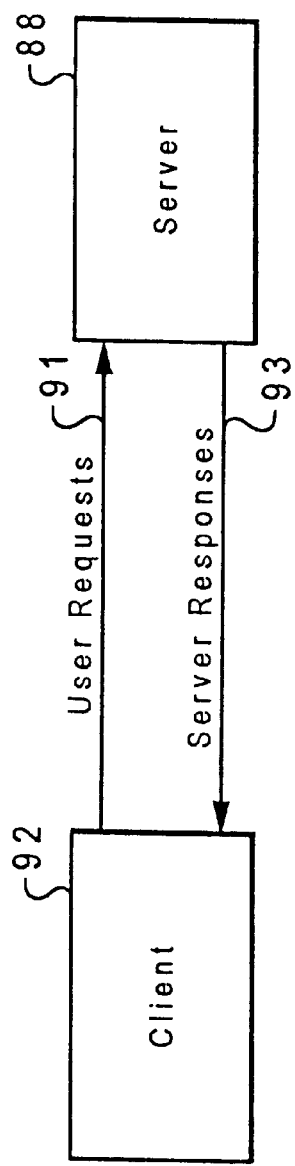
FIG. 3 illustrates a block diagram illustrative of a client/server architecture in accordance with a preferred embodiment of the present invention.
Figure 4:
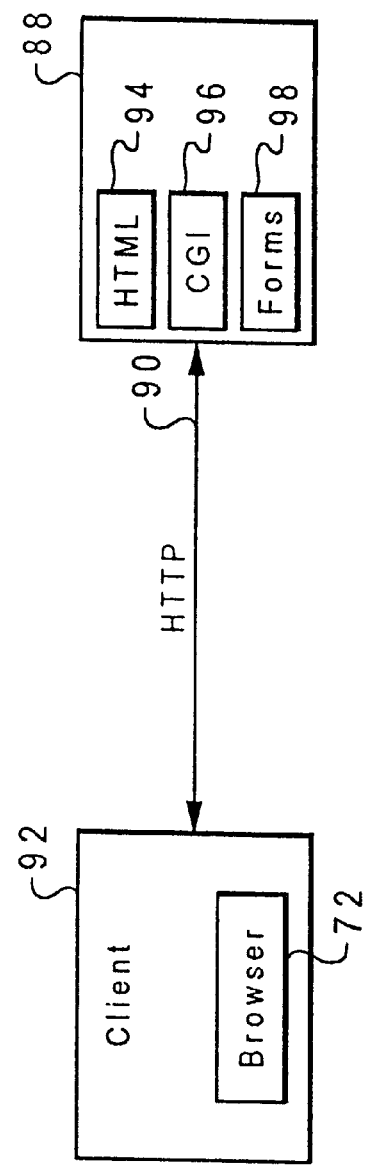
FIG. 4 depicts a detailed block diagram of a client/server architecture in accordance with a preferred embodiment of the present invention.
Figure 5:
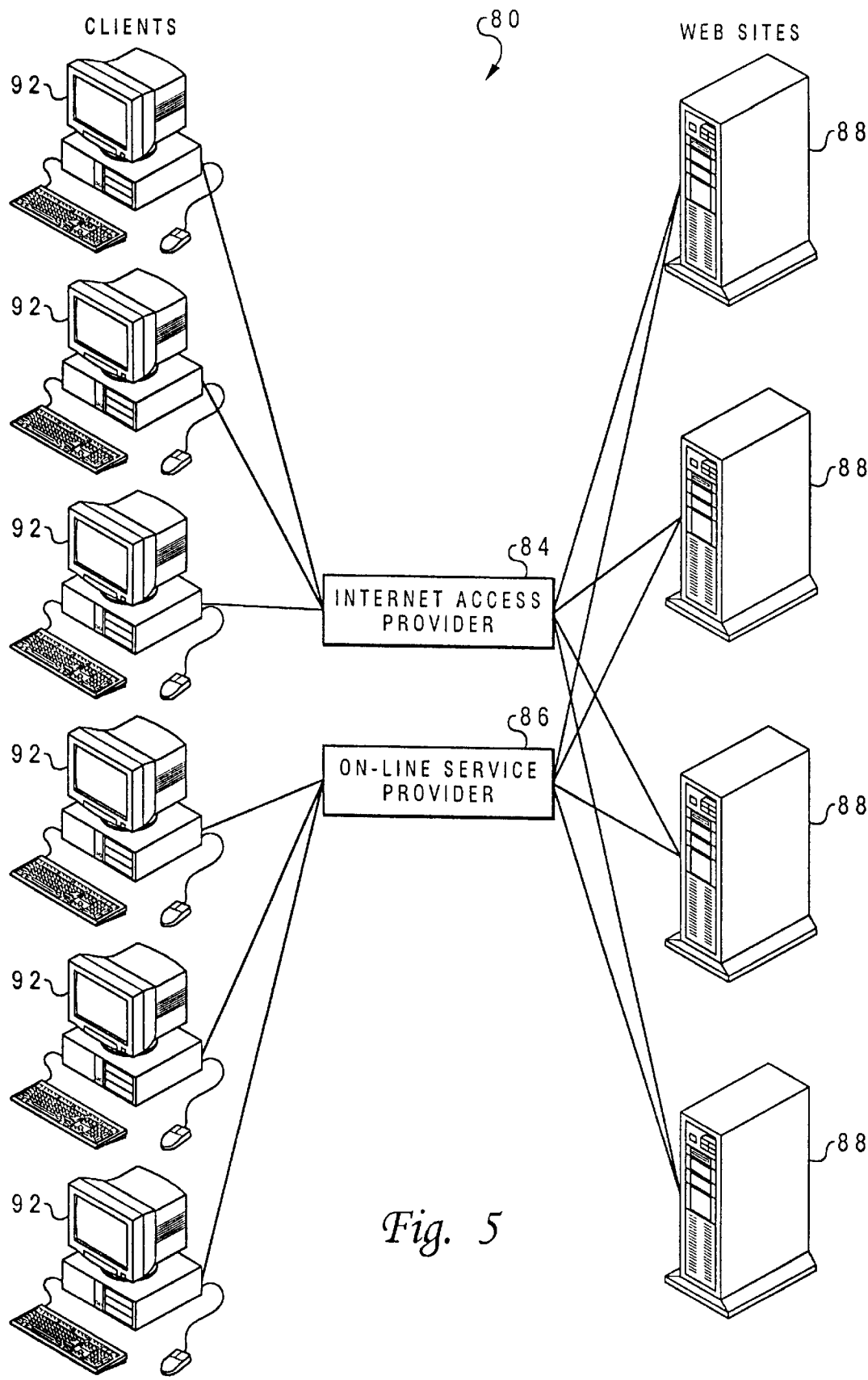
FIG. 5 is a diagram illustrative of a computer network which can be implemented in accordance with a preferred embodiment of the present invention.

In FIG. 3, FIG. 4, and FIG. 5, like parts are indicated by like numbers. FIG. 3 illustrates a block diagram illustrative of a client/server architecture in accordance with a preferred embodiment of the present invention. In FIG. 3, user requests 91 for news are sent by a client application program 92 to a server 88. Server 88 can be a remote computer system accessible over the Internet or other communication networks. Client application program 92 may be utilized with computer 20 of FIG. 1 and the implementation of computer 20 illustrated in FIG. 2. Server 88 performs scanning and searching of raw (e.g., unprocessed) information sources (e.g., newswire feeds or newsgroups) and, based upon these user requests, presents the filtered electronic information as server responses 93 to the client process. The client process may be active in a first computer system, and the server process may be active in a second computer system, communicating with one another over a communications medium, thus providing distributed functionality and allowing multiple clients to take advantage of the information-gathering capabilities of the server.

FIG. 4 illustrates a detailed block diagram of a client/server architecture in accordance with a preferred embodiment of the present invention. Although the client and server are processes that are operative within two computer systems, these processes being generated from a high-level programming language (e.g., PERL), which is interpreted and executed in a computer system at runtime (e.g., a workstation), it can be appreciated by one skilled in the art that they may be implemented in a variety of hardware devices, either programmed or dedicated.

Client 92 and server 88 communicate by utilizing the functionality provided by HTTP. Active within client 92 is a first process, browser 72, which establishes connections with server 88, and presents information to the user. Any number of commercially or publicly available browsers can be utilized in various implementations in accordance with the preferred embodiment of the present invention. For example, the Mosaic-brand browser available from the National Center for Supercomputing Applications (NCSA) in Urbana-Champaign, Ill., can be utilized in accordance with a preferred embodiment of the present invention. Other browsers, such as Netscape™, also provide the functionality specified under HTTP. "Netscape" is a trademark of Netscape, Inc.

Server 88 executes the corresponding server software, which presents information to the client in the form of HTTP responses 90. The HTTP responses 90 correspond with the web pages represented using HTML, or other data generated by server 88. Server 88 provides HTML 94. Under certain browsers, such as the Mosaic-brand browser described herein, a Common Gateway Interface (CGI) 96 is also provided, which allows the client program to direct server 88 to commence execution of a specified program contained within server 88. This may include a search engine that scans received information in the server for presentation to the user controlling the client. Using this interface, and HTTP responses 90, the server may notify the client of the results of that execution upon completion. Common Gateway Interface (CGI) 96 is one form of a gateway, a device utilized to connect dissimilar networks (i.e., networks utilizing different communications protocols) so that electronic information can be passed from one network to the other. Gateways transfer electronic information, converting such information to a form compatible with the protocols used by the second network for transport and delivery.

In order to control the parameters of the execution of this server-resident process, the client may direct the filling out of certain "forms" from the browser. This is provided by the "fill-in-forms" functionality (i.e., forms 98), which is provided by some browsers, such as the Mosaic-brand browser described herein. This functionality allows the user via a client application program to specify terms in which the server causes an application program to function (e.g., terms or keywords contained in the types of stories/articles which are of interest to the user). This functionality is an integral part of the search engine.

FIG. 5 is a diagram illustrative of a computer network 80, which can be implemented in accordance with a preferred embodiment of the present invention. Computer network 80 is representative of the Internet, a known computer network based on the client-server model discussed herein. Although the example described herein relates to the Internet, those skilled in the art will appreciate that computer network 80 may be implemented utilizing other distributed computer networks. For example, so-called "intranet" systems well known in the art of data communications can be utilized to implement computer network 80. Conceptually, the Internet includes a large network of servers 88 that are accessible by clients 92, typically users of personal computers, through some private Internet access provider 84 (e.g., such as Internet America) or an on-line service provider 86 (e.g., such as America On-Line, Prodigy, Compuserve, and the like). Each of the clients 92 may run a browser to access servers 88 via the access or service providers. Each server 88 operates a so-called "web site" that supports files in the form of documents and pages. A network path to servers 88 is identified by a Universal Resource Locator having a known syntax for defining a network collection.

Figure 6:
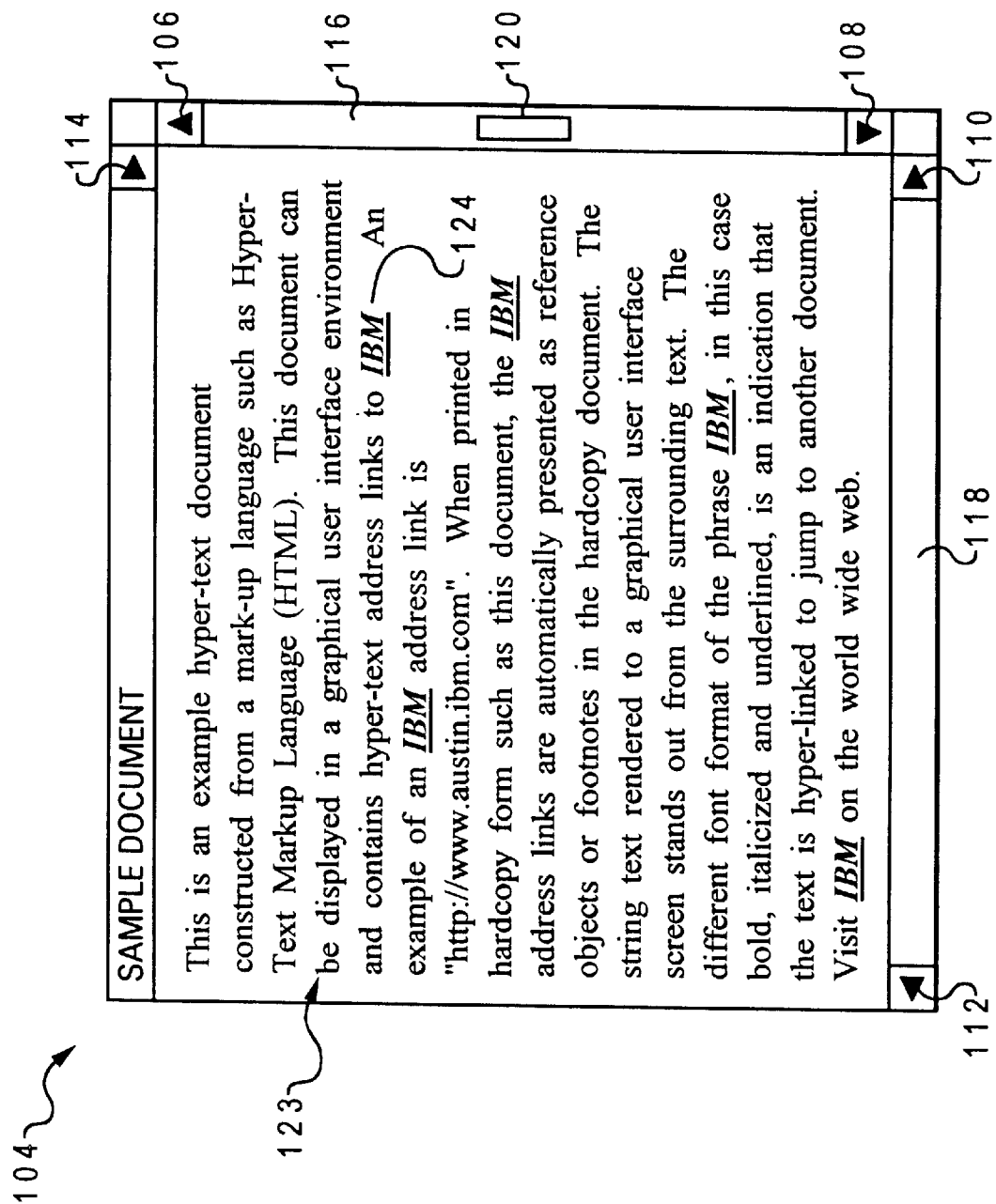
FIG. 6 illustrates a sample document contained within a conventional graphical user interface window.
Figure 7:
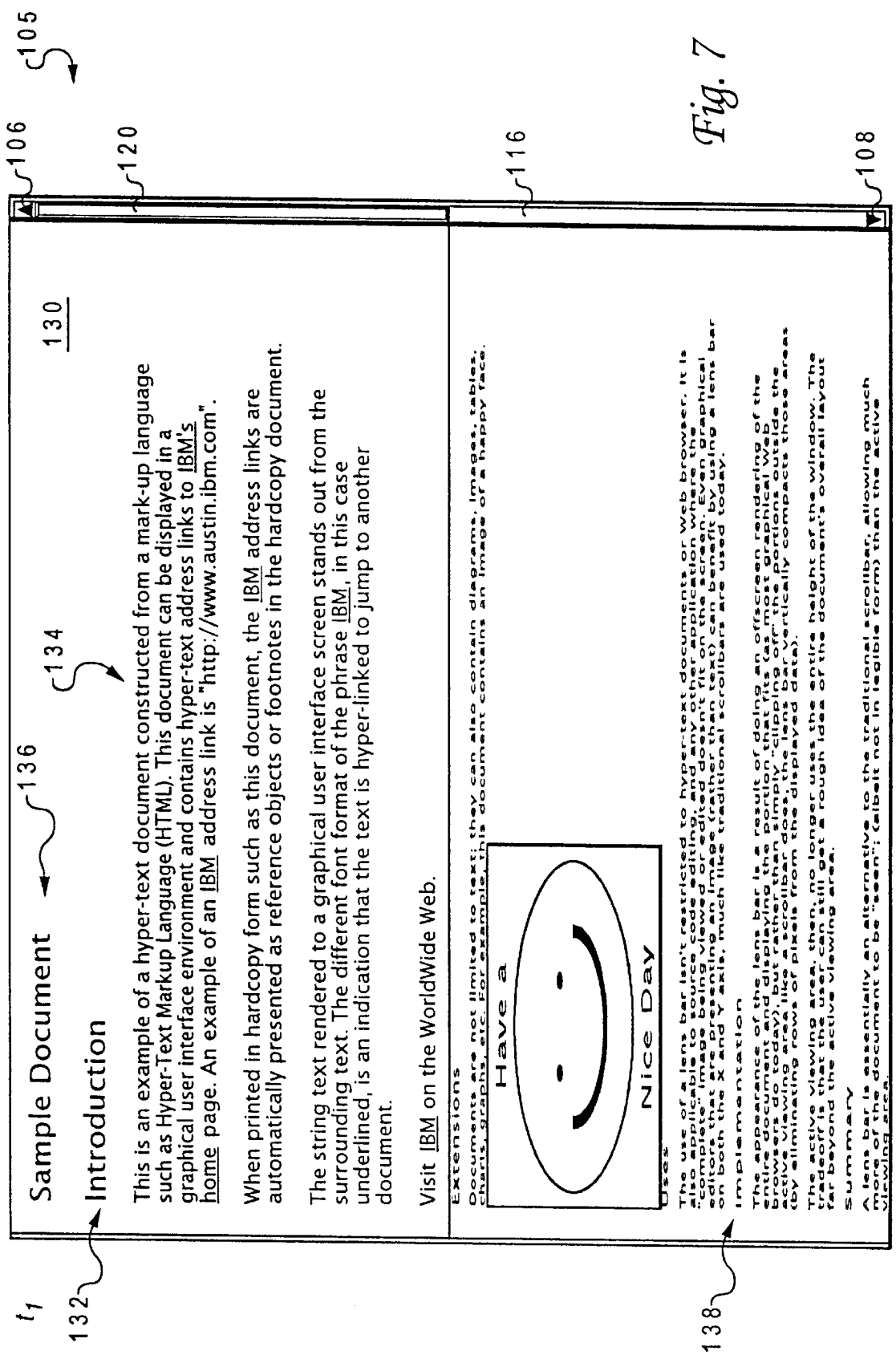
FIG. 7 depicts a lens bar displayed within a graphical user interface window at an initial time, in accordance with a preferred embodiment of the present invention.
Figure 8:
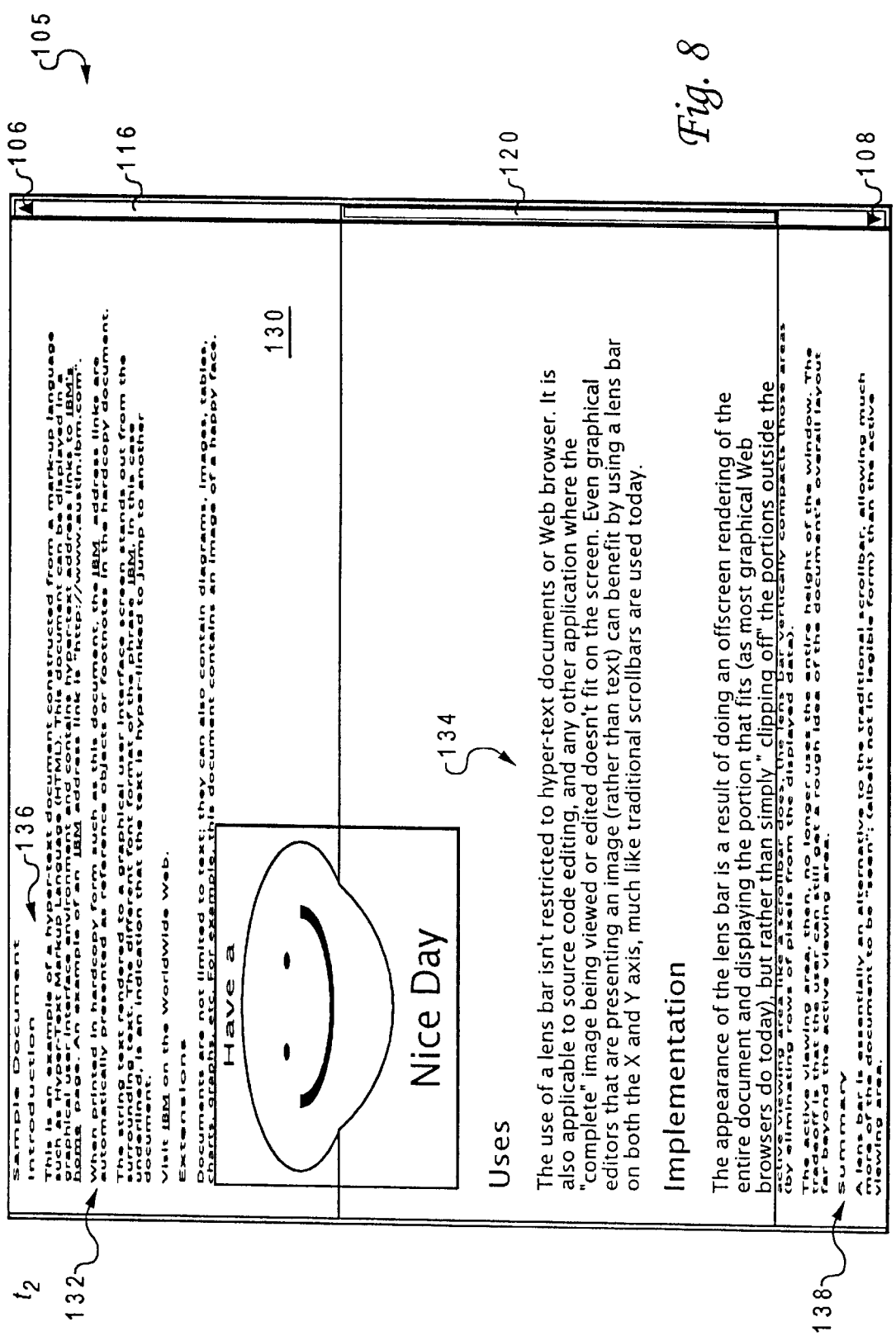
FIG. 8 depicts a lens bar displayed within a graphical user interface window at a time subsequent to the time depicted in FIG. 7, in accordance with a preferred embodiment of the present invention.

In FIG. 6, FIG. 7, and FIG. 8, like parts are referenced by like numbers. FIG. 6 illustrates a sample document 123 contained within a graphical user interface window 104, which can be utilized in accordance with a preferred embodiment of the present invention. Note that a graphical user interface is a type of display format that enables the user to choose commands, start programs, and see lists of files and other options by pointing to pictorial representations (i.e., icons) and lists of menu items on the screen (i.e., monitor screen). Choices can generally be activated with a keyboard or a mouse. Sample document 123 can constitute a web page, as previously defined herein. Note that the term "web page" can be distinguished from "pages" contained within a scrollable document such as sample document 123. Thus, sample document 123 can potentially include many individual "pages" within a single "web page." Only a portion of sample document 123 is actually displayed within window 104. Large portions remain unviewable because they are positioned "above" and "below" window 104. Window 104 essentially displays a portion of a viewable object (i.e., sample document 123) constructed from a mark-up language. One such mark-up language that can be utilized in accordance with the example presented in FIG. 6, is the Hypertext Mark-up Language (HTML). The size and position of elevator 120 within scroll bar 116 corresponds to the size and position of the current viewable page in relation to sample document 123. Sample document 123 can be accessed from a computer system contained within a computer network such as the Internet.

In the example of FIG. 6, because sample document 123 includes too many pages to view simultaneously, the user can position a mouse cursor over up-arrow section 106 or down-arrow section 108 of scroll bar 116 and click a pointing device (e.g., a mouse) to scroll the sample document 123 upward or downward, as appropriate. Scroll bar 116 thus provides a scrolling function. "Scrolling," well known in the art of graphical user interface icons, is the process of moving a document in a window such as window 104 to permit viewing of any desired portion. "Scrolling" is so named because it is the electronic equivalent of reading through a rolled or scrolled document rather than flipping through the pages of a book. Scrolling can also be accomplished utilizing "PgUp" and "PgDn" keys commonly included on computer keyboards such as keyboard 26 depicted in FIG. 1. A horizontal scroll bar 118 includes arrow sections 112 and 110 for scrolling sample document 123 respectively left or right. Also, an optional arrow section 114 allows a user to scroll the document right. Thus, the graphical user interface that contains window 104 and sample document 123 is a type of computer display format that enables a user to choose commands, start programs, and see lists of files and other options by pointing to pictorial representations (i.e., icons) and lists of menu items on the screen. Choices can generally be activated either with a keyboard or a mouse.

Sample document 123 contains specific string text 124 rendered on the screen by the graphical user interface to stand out from the surrounding text. String text 124 is rendered in a different format. In the example of FIG. 6, string text 124 is rendered as IBM. The different font format of string text 124 is an indication that the text is hyper-linked to "jump" to another document. When a user clicks on string text 124 with a mouse or other pointing device, the graphical user interface shifts the presently viewed sample document 123 to another hyper-linked document. Those skilled in the art will appreciate that sample document 123 can be displayed within a web browser and can include "links" to other sites within a computer network such as the Internet. However, those skilled in the art can also appreciate that a stand alone document can be displayed within window 104. In other words, window 104 can comprise a graphical user interface window utilized in conjunction with data-processing applications such as word processors or spread sheets.

It is clear from FIG. 6 that utilizing scroll bar 116 does not allow the user to have a sense of where the user is located within the entire sample document 123, particularly because the entire sample document 123 does not fit within window 104. Scroll bar 116 allows the user some sense of the global length of sample document 123 but does not provide the user with sufficient information to comprehend how much information lies before or after the currently displayed portion of the document or "page" and how the previous and successive information is laid out within sample document 123. Thus, utilizing only scroll bar 116 does not allow a user to determine how much further to scroll to get to the position within sample document 123 in which the user is interested.

FIG. 7 depicts a lens bar 130 displayed within graphical user interface window 105 at an initial time in accordance with a preferred embodiment of the present invention. FIG. 7 illustrates lens bar 130 at time $t_1$. A sample document 132 is displayed within window 105, which is analogous to window 104 of FIG. 6. Lens bar 130 overlays the entire body of sample document 132. The entire sample document 132 is actually displayed within window 105. A user can utilize scroll bar 116 to scroll lens portion 134 of lens bar 130 through sample document 132. A "normal" view of sample document 132 is indicated at lens portion 134. A user can clearly read text or graphics displayed within lens portion 134. Lens bar 130 also includes a top portion 136 and a bottom portion 138. The top portion 136 displays a beginning portion of sample document 132 and bottom portion 138 displays an ending portion of sample document 132.

Lens bar 130 thus offers the user a global sense of where the user is located within a long document that does not normally fit entirely within a window such as window 105. A rendering of the entire sample document 132, however, is depicted within window 105. Only a certain number of local lines or number of pixels in the case of a bit-mapped image are displayed "full size" or via a normal view as depicted at lens portion 134. Everything after this localized view is displayed within lens bar 130 in ever decreasing size and height, either continuously or at discrete intervals. Thus, information furthest from the localized view appear the smallest to a user.

FIG. 8 depicts a lens bar 130 displayed within graphical user interface window 105 at a time subsequent to the time depicted in FIG. 7, in accordance with a preferred embodiment of the present invention. FIG. 8 illustrates lens bar 130 at time $t_2$. In FIG. 8, Lens bar 130 provides the user a sense of what appears prior to and after lens portion 134. It can be appreciated by those skilled in the art that lens bar 130 can also take the place of scroll bar 116. A user can place a cursor over a particular portion of the document displayed within lens bar 130 and utilizing a pointing device such as a mouse, click that particular portion. The graphical user interface is thus instructed via this user input to display within lens portion 134 that portion of entire document 132 chosen with the pointing device. After the user "clicks" this particular portion of the entire sample document 132 within lens bar 130, text or graphics corresponding to the portion of entire sample document chosen from lens bar 130 are displayed within window 105. Lens bar 130 also displays, albeit at a "less" magnified view, the same characters or text displayed within window 105.

Those skilled in the art can appreciate that the lens bar depicted in FIG. 7 and FIG. 8 would be of special interest to software developers who find it necessary to view listings of source code that are hundreds or thousands of lines long. Having a sense of the indentation of source statements, even if such statements are not readable via lens bar 130, can provide a helpful visual cue to where a user is located within the source file. Lens bar 130 can be utilized in accordance with the "Internet" and "Web" discussed herein. For example, lens bar 130 allows a web browser to render a long document in a manner that can be navigated and browsed more efficiently. Lens bar 130 thus allows a user to interpret an entire document at one time on a global scale, while providing the user with an enlarged view of the local area of interest.

Figure 9:
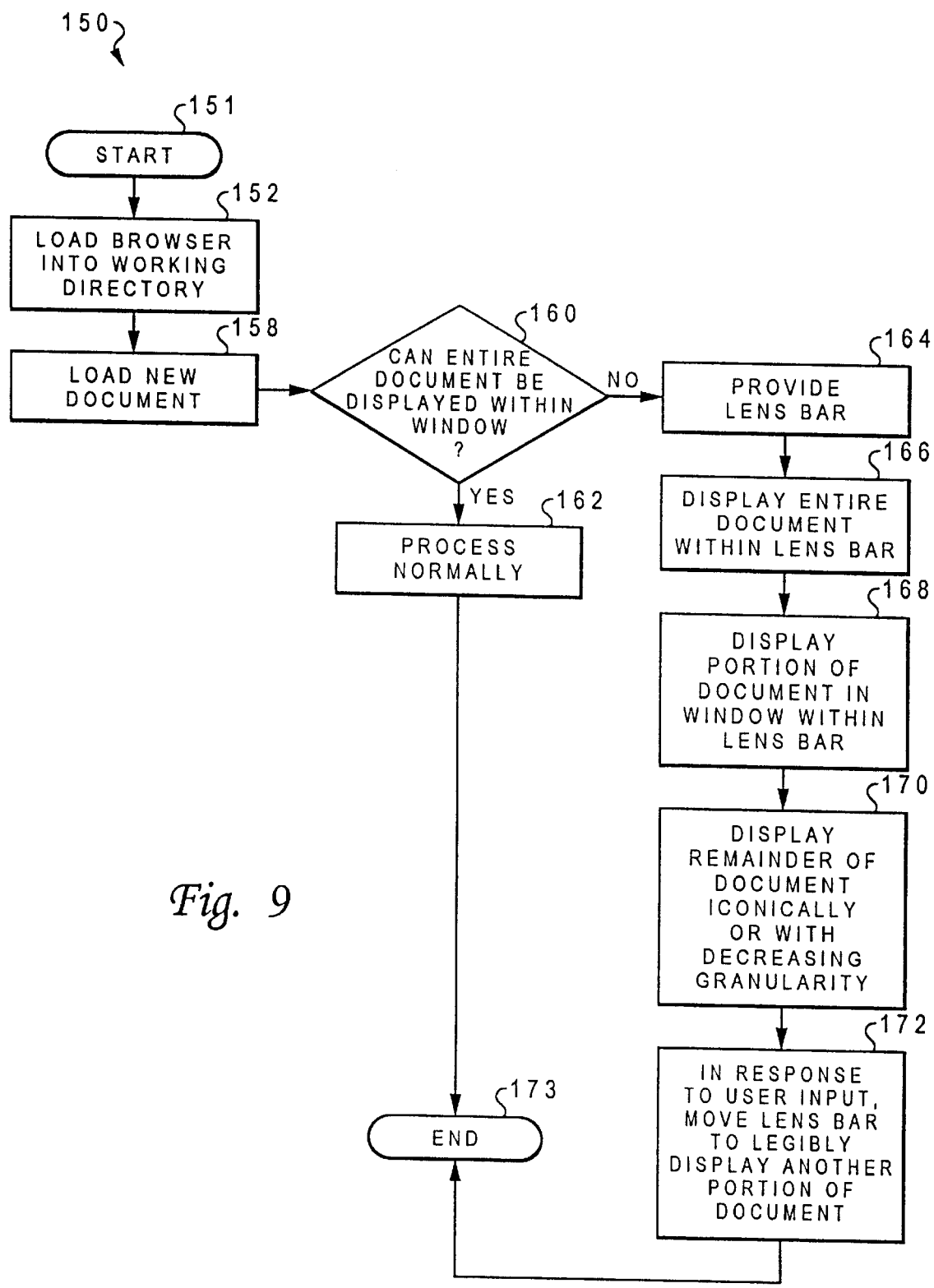
FIG. 9 illustrates a flow diagram that shows steps used to carry out the method and system of the present invention, according to a preferred embodiment of the present invention.

FIG. 9 illustrates a flow diagram 150 that shows steps that can be utilized to carry out the method and system of the present invention, according to a preferred embodiment of the present invention. As depicted at block 151, the process illustrated in FIG. 9 is initiated. As shown at block 152, a browser (e.g., browser 72 of FIG. 4) is initially loaded into a working directory of a data-processing system for utilization by a graphical user interface. As described at block 158, a new document is loaded into the working directory of the data-processing system. For example, in the case of a web browser, the web browser can display a "web page" following activation of a hypertext link to that particular web page. The web page can also include additional hypertext links. Those skilled in the art can appreciate, however, that the method described herein need not necessarily be utilized only in association with a web browser. For example, in the case of a word processing application, a document can be loaded into the working directory of the data-processing system and then utilized by the word processing application in association with the method described herein.

As illustrated at block 160 a test is performed to determine whether or not the entire document can be displayed within the graphical user interface window in which the web browser operates. If it is determined that the entire document is displayed within the graphical user interface window, then a lens bar is not necessary for this particular document and the user can utilize a normal scroll bar. Thus, the graphical user interface and web browser application continues to operate normally, as depicted at block 162, and the process is then terminated, as described at block 173. However, if it is determined that the entire document is too large to be displayed within the graphical user interface window, then the graphical user interface application provides a lens bar, as indicated at block 164. As depicted at block 166, the entire document is displayed within the lens bar in its entirety. As illustrated at block 168, a portion of the document is displayed within the lens portion of the lens bar according to a "normal" view. For example, in most word-processing programs, documents are displayed with particular fonts. Thus, the portion of the document displayed within the lens portion corresponds to the "normal" view, which can be clearly interpreted by the viewer via human discernable fonts. Note that in the example lens bar depicted in FIG. 7 and FIG. 8, the entire document is also displayed in its entirety within a graphical user interface window (i.e., window 105). However, without the presence of the lens bar operating in association with window 105, the document would not be displayed in its entirety within window 105. The presence of the lens bar is thus an aid which provides a user with a general "view" of an entire document, which window 105 does not provide on its own.

As described at block 170, the remainder of the document can be displayed iconically. That is, text or objects displayed outside of the lens portion are displayed accordingly within the lens bar in iconic representations. The top portion of the lens bar corresponds to pages "above" the human discernable portion of the document, and the bottom portion of the lens bar corresponds to pages "below" the human discernable portion of the document. Thus, the representation nearest the bottom and top of the document, furthest from the human discernable portion, becomes increasingly iconic. For example, small "dots" or textual "dashes" can indicate the presence of text or objects within the document. Alternatively, the remaining text or objects can be displayed with decreasing granularity. Thus, text or objects will appear smaller and smaller at an increasing distance on the lens bar from the displayed portion which corresponds to the objects or text displayed within the window. As illustrated at block 172, in response to user input (e.g., such as user input derived from a mouse) at a particular portion of the lens which does not present a "normal" view of the document, the lens bar shifts to display a normal view of the particular portion "clicked" (e.g., mouse input) by the user. In effect, the lens bar moves to display a new portion of the document, while the overall document remains static. The lens bar thus displays a new portion of the document in a "normal" or legible view. Finally, as illustrated at block 173, the process depicted in FIG. 9 is terminated.

It can be appreciated by those skilled in the art that FIG. 9 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 depicted in FIG. 1 and FIG. 2, in processing electrical or other (e.g. mechanical, chemical) physical signals to generate other desired physical signals.

The embodiments and examples set forth herein are presented in order to best explain the present invention and its practical application and, thereby, to enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for displaying a document that is too large to be legibly displayed in its entirety in a display device of a data processing system, said method comprising:

displaying a window in a display device of a data processing system and displaying a vertical scroll bar for said window, said vertical scroll bar including an elevator box having a height;

displaying a lens in said window in vertical alignment with said elevator box, said lens having a height that substantially equals the height of said elevator box; and displaying a two-dimensional representation of a document in said window by:

displaying a primary portion of said document within said lens utilizing a first magnification level that makes said primary portion legible; and displaying a remaining portion of said document within said window utilizing a different second magnification level that allows all of said document to fit entirely within said window.

2. A method according to claim 1, wherein:

said document comprises contents having predetermined relative horizontal positions;

said first magnification level and said second magnification level each comprise a vertical magnification factor and a horizontal magnification factor; and said method further comprises utilizing substantially equal horizontal magnification factors for said first magnification level and said second magnification level, such that said predetermined relative horizontal positions of said contents are maintained throughout said window.

3. A method according to claim 2, wherein said primary portion of said document is an original primary portion, said method further comprising:

in response to operator input moving said elevator box from a first position to a second position, displaying a new primary portion of said document within said lens utilizing said first magnification level, and displaying all of said original primary portion that is not in said new primary portion utilizing said second magnification level.

4. A method according to claim 3, wherein said second magnification level comprises a range of vertical magnification levels that decrease in proportion to vertical distance from said lens.

5. A method according to claim 4, further comprising:
when said vertical magnification level would cause corresponding contents of said document to be displayed illegibly, displaying in said window, in lieu of said corresponding contents, textual characters that are less complex than said corresponding contents.

6. A method according to claim 5, wherein said remaining portion is displayed within said window above said lens and below said lens.

7. A data processing system for displaying a document that is too large to be legibly displayed in its entirety in a display device of said data processing system, said data processing system comprising:
   a graphical user interface for displaying a window in a display device of a data processing system and for displaying a vertical scroll bar for said window, said vertical scroll bar including an elevator box having a height;
   a lens generator for displaying a lens in said window in vertical alignment with said elevator box, said lens having a height that substantially equals the height of said elevator box; and
   a document presenter for displaying a two-dimensional representation of a document in said window by:
      displaying a primary portion of said document within said lens utilizing a first magnification level that makes said primary portion legible; and
      displaying a remaining portion of said document within said window utilizing a different second magnification level that allows all of said document to fit entirely within said window.

8. A data processing system according to claim 7, wherein:
   said document comprises contents having predetermined relative horizontal positions;
   said first magnification level and said second magnification level each comprise a vertical magnification factor and a horizontal magnification factor; and
   said document presenter maintains said predetermined relative horizontal positions of said contents throughout said window by utilizing substantially equal horizontal magnification factors for said first magnification level and said second magnification level.

9. A data processing system according to claim 8, wherein:
   said primary portion of said document is an original primary portion; and
   said document presenter responds to operator input moving said elevator box from a first position to a second position by displaying a new primary portion of said document within said lens utilizing said first magnification level and displaying all of said original primary portion that is not in said new primary portion utilizing said second magnification level.

10. A data processing system according to claim 9, wherein said second magnification level comprises a range of vertical magnification levels that decrease in proportion to vertical distance from said lens.

11. A data processing system according to claim 10, wherein, when said vertical magnification level would cause corresponding contents of said document to be displayed illegibly, said document presenter displays textual characters that are less complex than said corresponding contents in said window, in lieu of said corresponding contents.

12. A data processing system according to claim 11, wherein said document presenter displays said remaining portion within said window above said lens and below said lens.

13. A program product for displaying a document that is too large to be legibly displayed in its entirety in a display device of a data processing system, said program product comprising:
   a graphical user interface for displaying a window in a display device of a data processing system and for displaying a vertical scroll bar for said window, said vertical scroll bar including an elevator box having a height;
   a lens generator for displaying a lens in said window in vertical alignment with said elevator box, said lens having a height that substantially equals the height of said elevator box;
   a document presenter for displaying a two-dimensional representation of a document in said window by:
      displaying a primary portion of said document within said lens utilizing a first magnification level that makes said primary portion legible; and
      displaying a remaining portion of said document within said window utilizing a different second magnification level that allows all of said document to fit entirely within said window; and
   a computer usable medium encoding said graphical user interface, said lens generator, and said document presenter.

14. A program product according to claim 13, wherein:
   said document comprises contents having predetermined relative horizontal positions;
   said first magnification level and said second magnification level each comprise a vertical magnification factor and a horizontal magnification factor; and
   said document presenter maintains said predetermined relative horizontal positions of said contents throughout said window by utilizing substantially equal horizontal magnification factors for said first magnification level and said second magnification level.

15. A program product according to claim 14, wherein:
   said primary portion of said document is an original primary portion; and
   said document presenter responds to operator input moving said elevator box from a first position to a second position by displaying a new primary portion of said document within said lens utilizing said first magnification level and displaying all of said original primary portion that is not in said new primary portion utilizing said second magnification level.

16. A program product according to claim 15, wherein said second magnification level comprises a range of vertical magnification levels that decrease in proportion to vertical distance from said lens.

17. A program product according to claim 16, wherein, when said vertical magnification level would cause corresponding contents of said document to be displayed illegibly, said document presenter displays textual characters that are less complex than said corresponding contents in said window, in lieu of said corresponding contents.

18. A program product according to claim 17, wherein said document presenter displays said remaining portion within said window above said lens and below said lens.

* * * * *